United States Patent [19]

Humphries et al.

[11] Patent Number: 4,970,269
[45] Date of Patent: Nov. 13, 1990

[54] COMPOSITIONS OF POLYMERS WITH SULFPHATE AND/OR SULFPHONATE GROUPS

[75] Inventors: Martyn Humphries, Manchester; Jozef Nemcek, Chester; John C. Padget, Frodsham; Christopher C. Mollett, Littleton, all of England

[73] Assignee: Imperial Chemical Industries PLC, London, England

[21] Appl. No.: 376,145

[22] Filed: Jul. 5, 1989

Related U.S. Application Data

[63] Continuation of Ser. No. 5,801, Jan. 22, 1987, abandoned.

[30] Foreign Application Priority Data

Jan. 22, 1986 [GB] United Kingdom ............... 8601451
Apr. 21, 1986 [GB] United Kingdom ............... 8609702

[51] Int. Cl.$^5$ .................. C08F 220/44; C08F 8/14
[52] U.S. Cl. .................. 525/329.2; 523/122; 524/547; 525/329.4; 525/329.7; 525/330.6; 525/384; 526/286
[58] Field of Search ............... 525/329.4, 329.2, 329.7, 525/330.6, 384

[56] References Cited

U.S. PATENT DOCUMENTS 4,535,139  8/1985  Brauer .................. 526/287
4,546,159 10/1985  Taylor .................. 526/286
4,548,870 10/1985  Ogawa .................. 428/474.7
4,774,080  9/1988  Yamamori et al. .

OTHER PUBLICATIONS

Chemical Abstracts, vol. 90, No. 6, Feb. 5, 1979, p. 78, No. 40342c.
Chemical Abstracts, vol. 101, No. 19, 11/5/84, p. 231, No. 165557d.
Chemical Abstracts, vol. 95, No. 18, 11/2/81, p. 88, No. 152312c.

Primary Examiner—Christopher Henderson
Attorney, Agent, or Firm—Cushman, Darby & Cushman

[57] ABSTRACT

Coating composition suitable for treating a surface so as to provide a water-erodible coating thereon, which composition comprises at least one erodible polymer comprising one or more hydrolysable groups selected from sulphonate esters and sulfphonate esters which in an aqueous environment will generate by hydrolysis corresponding polymer-bound acid groups. The erodible polymers are described in detail and a method of treating surfaces using the composition is described.

11 Claims, No Drawings

COMPOSITIONS OF POLYMERS WITH SULFPHATE AND/OR SULFPHONATE GROUPS

This is a continuation of application No. 07/005,801, filed Jan. 22, 1987, now abandoned.

This invention relates to compositions suitable for the treatment of surfaces so as to provide water-erodible coatings thereon, to polymers for inclusion in the compositions, and to the treatment of surfaces using the compositions.

The problems caused by the adhesion of living organisms to surfaces, especially to surfaces subjected to an aqueous environment, are well known. An example is the fouling of underwater surfaces in, for example, the sea, rivers, lakes, canals, swimming pools, industrial plant, pipes, etc. This fouling is caused by the attachment to those surfaces of a variety of micro and other organisms which then grow and multiply so as eventually to cause a significant problem in relation to the surface concerned. Of particular importance is the case of a sbip's hull; the growth of marine organisms thereon increases the frictional resistance of the hull to passage through water and so increases fuel consumption and/or reduces the speed of the ship. Removal of the growths by cleaning and repainting the ship's hull in a dry dock is extremely expensive and time-consuming.

Another example of the attachment of micro-organisms to a surface subjected to an aqueous environment is the adhesion of bacteria, for example Streptococcus mutans, to human teeth leading, in many cases, to dental caries or other oral hygiene problems.

One approach to these problems has been to use biocides (by "biocides" is meant herein substances which are toxic to and destroy various types of microorganisms, and include e.g. fungicides, algicides, etc). Thus, it is known to apply to ships' hulls anti-fouling coatings in which the active ingredient is a biocide which is slowly released from the coating over a period in sufficient concentration to be lethal to marine organisms in the immediate vicinity of the protected surface. Eventually, the concentration of biocide in the coating falls below the lethal concentration and the coating must be renewed. For a time, this method provides an effective means of reducing surface fouling.

An alternative development has been the use of the anti-fouling cOatings in which an organic tin biocide compound is present as a hydrolysable group attached to the polymer backbone. Hydrolysis of these linkages releases toxic organotin material, leaving a water erodible polymer residue, which is subsequently removed by motion of the vessel through the sea-water. A fresh surface is thus revealed Such action produces a "self-polishing" effect and increases fuel efficiency. In addition, release of organotin biocide is relatively constant during the lifetime of the coating.

A recent patent application (PCT Application WO84/02915) discloses an anti-fouling coating comprising mixtures of biocides and erodible polymers of substituted acrylic and methacrylic esters. A number of hydrolytically unstable polymers have been described.

A different type of coating is described in Japanese Patent Publication No. 78-108126. This document embodies a solvent-borne coating comprising a biocide (triphenyltin hydroxide) and a polymeric binder based on a copolymer of polypropylene glycol, methyl methacrylate, ethyl acrylate and vinyl acetate. Anti-fouling properties and excellent crack resistance are claimed, although inclusion of toxic material is still required.

The need for regular renewal of coatings Which are not self-polishing is a disadvantage. Also the danger to the aqueous (marine) environment posed by the continuous release of toxic organotin groups from a polymer chain backbone by hydrolysis in a self-polishing action is now becoming apparent.

Another approach to this type of problem relies on the use of agents which are not toxic to the offending organisms but prevent or reduce their adhesion to the surface in question. An example of this approach in relation to the protection of ships' hulls is described in the Journal of Coatings Technology, 54, 83, 1982. Coatings made of cellulose acetate and silica-bearing methyl siloxane resin applied respectively to PVC and steel panels showed marine fouling resistance for a short period of time. According to the authors, no non-toxic anti-fouling coatings have reached a commercial stage.

Another example (Japanese Patent Publication No. 78-97084) discloses a water-thinned coating composition based on polypropylene glycol methacrylate and a number of (meth)acrylic esters which is applied to steel and baked at 100° C., to give a coating which is more resistant to "soiling" than one in which polypropylene glycol monomethacrylate is absent.

A method of treating a rather different kind of marine substrate is described in Japanese Patent Publication No 77-B129 Which is concerned With preventing the attachment of marine creatures to the surface of shellfish. The method comprises forming a Water-swellable polymer On the surface of the shell by polymerising a monomer thereon in the presence of an acidic sulphite ion and a peroxide. This document specifically describes the formation of a water-swellable polymer on the shells of pearl oysters by the polymerization of acrylamide together with a minor amount of methylene-bis-acrylamide. Other monomers mentioned include the polyethylene qlycol and polypropylene glycol esters of acrylic and methacrylic acids, vinyl pyrrolidone, vinyl pyridine and styrene sulphonic acid. In order for the polymer to be strongly held to the surface of the shell, the use of the acidic sulphite ion is essential.

In the field of oral hygiene, attempts to prevent calculus and plaque from adhering to the surfaces of teeth have included the use of cationic, nonionic and anionic surface active agents (for example J. Periodont, 38, 294, 1967 and Caries Res. 16, 440, 1982). In general, the nonionic agents (usually polyethenoxy compounds) have been found less effective than the ionic surface active agents.

In our European Patent Publication No. 0182523A and UK Publication No 2167075A we describe certain defined formulations containing polyethenoxy and polypropenoxy cOmpounds. These compounds have shown efficacy in substantially reducing bacterial adherence to surfaces of teeth and reduction of bacterial growth on treated hydrophobic surfaces such as painted steel.

There has also been described (e.g. in German Offen. 2 601 928, PCT Application WO80/00554, Japanese Patent Publication 85-65076, and German Offen. 3 322 470) the uses of non-toxic matrix coatings in which diffusion-controlled release of hydrocarbon and/or silicon oils are claimed as effective anti-fouling coatings. Diffusion-controlled oil release however sutters from the limitations of all matrix systems in that release is time dependent, exhausted films require treatment before recoating and, more importantly, the absence of a self-polishing effect.

The present invention is concerned with coating compositions for providing a surface with a water-erodible coating which comprises an erodible polymer comprising sulphonate ester and/or sulphate ester groups, which groups generate acidic surface groups during hydrolysis thereby rendering the polymer and the coating containing it erodible; the non-sulphonate or non-sulphate (i.e. alcoholic) residues may themselves optionally be hydrophobic in nature and so may function in an analogous way to the paraffin or silicon oil matrix system mentioned above, but with the advantage of time-independent release coupled with the above-mentioned self-polishing effect. A biocide(s), and particularly a non-tin based biocide, may be incorporated in combination with the erodible polymer into the polymer-containing coating to provide effective anti-fouling behaviour. Furthermore, the erodible polymer can optionally contain alkylene oxide or poly(alkylene oxide) groups therein to generate an anti-adhesive effect which may inhibit anti-fouling in its own right whereby the presence of a biocide may not always be necessary (although its use may still be preferred).

Accordingly, the present invention provides a coating compositions suitable for treating a surface so as to provide a water-erodible coating thereon, which coating composition comprises at least one erodible polymer comprising one or more hydrolysable groups selected from sulphonate esters and sulphate esters which in an aqueous environment will generate by hydrolysis corresponding polymer-bound acid groups.

Thus when a surface is coated using a composition according to the invention, the resulting dried coating is water-erodible in an aqueous environment by virtue of polymer-bound acid groups being formed from the sulphonate and/or sulphate ester groups by hydrolysis, these being (at least for the most part) located on polymeric material in the environment-exposed exterior portion of the coating.

By a sulphonate or sulphate ester group is meant a group or linkage of formula $$-(O)_x-SO_2O-$$

where x=0 in the case of a sulphonate ester group and x=1 in the case of a sulphate ester group. As far as each individual sulphonate or sulphate group is concerned, its location in the polymer may be represented by

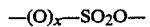

where $R_a$ and $R_b$ are residues representing the remainder of the polymer in relation to each individual sulphonate or sulphate group. The hydrolysis of any sulphonate or sulphate group in an aqueous environment (particularly in a marine environment of pH 1 to 3) can therefore be written as follows:

$R_a-SO_2OR_b \rightarrow R_aSO_2OH + R_bOH$ (sulphonate hydrolysis)

$R_aOSO_2 \rightarrow R_aOSO_2OH + R_bOH$ (sulphate hydrolysis)

so that —SO₂OH and/or —OSO₂OH acid groups are formed bonded to polymeric residues of the polymer located (at least for the most part) at the environment-exposed exterior portion of the applied coating. It may possibly be the case that these acid groups themselves inhibit the adhesion of living organisms to a certain extent; more importantly, however, they render water-erodible the polymeric residues to which they are attached so that an outer surface comprised of fresh unhydrolysed polymer molecules is continually formed, i.e. the polymer exhibits a "self-polishing" effect. Thus, by an "erodible polymer" is meant a polymer having polymeric residues that are removable under the conditions of use to which the coated surface is subjected thereby rendering the coating itself erodible; this may involve simple dissolution in the aqueous environment but more usually involves relatively facile but slow removal thereof as a result of relative motion in the vicinity of the coated surface, e.g. by motion of the surface (being e.g. part of a vessel, e.g. a ship's hull) through water or by the passage of water over the stationery surface (being e.g. part of a water-conveying conduit or pipe). If the coating also contains a biocide, that portion of it associated with the polymer being released at the surface of the coating is also released at the same time into the aqueous environment thereby creating an anti-fouling action. As mentioned above, the polymer may itself contain groups which create an anti-adhesion effect which might render the need for biocide unnecessary.

The hydrolysable sulphonate and/or sulphate ester groups are normally located as recurring groups present in one or more types of repeat unit of the polymer (i.e. each of such repeat units having at least one sulphonate and/or sulphate ester group) and usually in one or both of two types of repeating units in the polymer molecules, namely in one or more repeat units generally denoted by A in which each sulphonate or sulphate ester group is pendant to the main chain backbone, and/or in one or more repeat units generally denoted by a in which each sulphonate or sulphate ester group is itself within and so part of the main chain backbone of the polymer.

Any suitable polymerization technique may be used to form the erodible polymer, e.g. polymerization by a free-radical or ionically initiated addition process or by a condensation polymerisation process. Free-radical addition processes (employing olefinically unsaturated monomers) are normally employed when making polymers containing repeat units A while condensation polymerisation would normally be used for making polymers containing repeat units B.

The erodible polymer preferably comprises 1 to 50 mole % of repeat units A and/or B, more preferably 3 to 40 mole % and particularly 3 to 30 mole % (with 5 to 20 mole % being a typical range). The presence of more than 50 mole % of repeat units A and/or B in the polymer may in some cases render the resulting coating rather to erodible and liable to break up fairly quickly.

The type of repeat unit A is preferably represented as having the following formula:

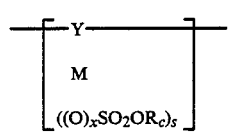   I wherein Y, which in the repeat units A of formula 1 maybe the same or different, is a grouping in the main chain backbone (and is preferably a hydrocarbyl residue or a substituted derivative thereof);

x is 0 or 1 (as before); s is an integer of 1 or more (preferably 1 to 4 and more preferably 1) corresponding to the number of $(O)_xSO_2OR_c$ groups in repeat unit A of formula I;

$R_c$, which in the same repeating unit A of formula I (when s is 2 or more) or in different repeating units A of formula I may be the same or different, is a group bonded to a sulphonate or sulphate function so as to form an ester therewith;

and wherein each $(O)_xSO_2OR_c$ group is joined via an intermediary or intermediaries M to the grouping Y, and in cases Where s is 2 or more may be joined to the same or different atoms of Y;

and wherein M represents one or more intermediaries in the repeat unit A of formula I.

The type of repeat unit B is preferably represented as having the following formula:

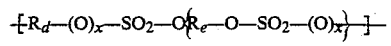  II wherein x is O or 1 (as before);
y is O or 1;
$R_d$, which in different repeating units B of formula II may be the same or different, is a group providing part of the polymer main chain backbone;

$R_e$, which in different repeating units B of formula II (when y is 1) may be the same or different, is a group providing part of the polymer main chain backbone.

The repeat units A (or B) in the polymer will usually all be of the same specific structure, although the scope of the invention is intended to embrace polymers having repeating units A (or B) of more than one specific structure.

In repeat unit B of formula II, $R_d$ and $R_e$ may be divalent aliphatic or aromatic radicals and are preferably selected from alkylene (including cycloalkylene) and phenylene radicals or substituted derivatives thereof. A polymer with repeat units B of formula —R$_d$—SO$_2$—O— could be formed by the self-condensation polymerisation of a monomer of formula HO—R$_d$—SO$_2$Cl (such as 3-hydroxy-propane-sulphonyl chloride, 4-hydroxy-cyclohexane-sulphonyl chloride, or 3-hydroxy-benzene sulphonyl chloride), while a polymer with repeat units B of formula —R$_d$—SO$_2$—O—R$_e$—O—SO$_2$— could be formed by the co-condensation polymerisation of a monomer of formula ClO$_2$S—R$_d$—SO$_2$Cl (e.g. 1,3-propane disulphonyl chloride, 1,4-cyclohexane disulphonyl chloride or 1,3-benzene disulphonyl chloride) with a diol of the formula HO-R$_e$-OH (e.g. 1,3-dihydroxypropane, 1,4-dihydroxy-n butane, or 1,3-dihydroxybenzene).

In repeat unit A of formula I, the intermediary or intermediaries M (which it will be appreciated may be the same or different in the repeat units A) can for example be selected from one or more direct links (that is to say one or more direct bonds) and one or more atoms or groups of atoms providing a linking atom or chain of atoms for joining each $(O)_xSO_2OR_c$ group to Y. Besides a direct link, examples of groups provided by M include:

| | |
|---|---|
| aliphatic groups e.g. | -(alkylene)- |
| carboxylic ester groups e.g. | —CO—O-(alkylene)- |
| carboxylic amide groups e.g. or | —CO—NH-(alkylene)-<br>—NH—CO-(alkylene)- |
| aromatic groups e.g. | -(arylene)- |
| alkarylene groups e.g. | -(alkylene)-(arylene)- |

-continued

| | |
|---|---|
| ether groups e.g. | -(alkylene)-O-(alkylene)-<br>-(alkylene)-O-(arylene)-<br>-(arylene)-O-(arylene)-<br>-(arylene)-O-(alkylene)- |
| alkyleneoxy or poly(alkyleneoxy) groups, | | or substituted derivatives thereof (NB in the above examples, the far right hand bond is intended to represent a bond to the sulphonate or sulphate group).

In the various above-mentioned examples for M, the -(alkylene)- groups therein can provide a linking chain of 1 or more carbon atoms, e.g. 1 to 20 carbon atoms (when more than about 20 atoms, particularly carbon atoms, exist betWeen the hydrolysadle pendant sulphonate or sulphate group and the polymer backbone, the contribution to the erodibility of the polymer by this group might become rather weak and so light not be very useful). Hence the preferred -(alkylene)- groups in the above exemplified examples for M (where used) can be represented by $-(CR_1R_2)_n-$ where n is an integer of 1 to 20 and $R_1$ and $R_2$ (which may be the same or different in each or, when n is 2 or more, in different —CR$_1$R$_2$—groups of the —(alkylene)—chain) are selected from H and alkyl or substituted alkyl groups (more preferably H or lower alkyl of 1 to 5 carbon atoms, particularly methyl, groups). Examples of such preferred alkylene groups would e.g. be —(CH$_2$)$_n$—where n is e.g. 1 to 20. Substantially the same considerations apply to the more hydrophilic alkyleneoxy or polyalkyleneoxy groups, with preferred groups of this type being represented by —(CHR$_3$CHR$_4$O)$_m$—where m is e.g. 1 to 15 and R3 and R4 (which may be the same or different in each —CHR$_3$CHR$_4$O—unit) are selected from H and alkyl or substituted alkyl (more preferably, H or lower alkyl of 1 to 5 carbon atoms, particularly methyl). Examples of such preferred alkyleneoxy groups would be —(CH$_2$CH$_2$O)$_m$—and —(CH$_2$CH(CH3)O)$_m$—where m is, e.g., 1 to 15. The-(arylene)-groups in the above-mentioned examples for M (where use can be represented by divalent aromatic radicals comprising a single or linked benzene ring system or conjugated benzene ring systems (although conceivably heteroaromatic rings might also be utilized). Usually the arylene groups will be para phenylene (ortho or meta phenylene can also be used). The use of para phenylene for M is particularly favoured since starting monomers (for making A repeat units) containing it are readily prepared.

In repeat unit A of formula I the residue $R_c$ may be selected to provide a desired hydrolysis rate, i.e. to provide a certain degree of control over the bydrolysis rate under the conditions of use. (Similar considerations apply in respect of residue $R_e$ in repeat unit B of formula II). Also, as discussed above, if $R_c$ is itself hydrophobic in nature, its release may well provide an additional degree of anti-fouling behaviour. Examples of $R_c$ residues include one or or more of the following groups:
- aliphatic groups and particularly alkyl groups, preferably containing 1 to 20 carbon atoms (more preferably 1 to 15 carbon atoms), and including primary, secondary and tertiary alkyls and also cycloalkyls; examples include methyl, ethyl, n-propyl, isopropyl, n-butyl, isobutyl, tert. butyl, n-pentyl, n-hexyl, cyclohexyl and n-decyl,
- aryl groups and particularly phenyl,

- alkaryl or aralkyl groups e.g. -(alkylene)-(aryl) such as benzyl, -(arylene)-(alkyl), -(alkylene)-(arylene)-(alkyl) e.g. —(CH$_2$)$_p$—Ph—(CH$_2$)$_{p'}$CH$_3$
where p and p' are independently 0 to 100 and —Ph— is para phenylene
- alkyleneoxyalkyl or poly(alkyleneoxy)alkyl groups e.g. (CH$_2$CH$_2$O)$_p$CH$_3$ or (CH$_2$CH$_2$(CH$_3$)O)$_p$CH$_3$ where p is 0 to 100 as above
- silyl groups.

Substituted derivatives of the above examples may of course also be used if appropriate (substituents could e.g. be halogen, hydroxy, alkoxy, aryl, alkyl and so on). We have found that control of the hydrolysis rate may indeed be controllable by appropriate selection of R$_c$ and, interestingly, our results so far indicate that hydrolysis appears to proceed more quickly with increasing chain length in R$_c$ in the R$_c$=lower alkyl series (the reverse might perhaps have been expected).

As mentioned above, Y is preferably a hydrocarbyl radical or a substituted derivative thereof and s is an integer of 1 or more and is preferably 1 to 4 and more preferably 1, and where s is 2 to 4 each (O)$_x$SO$_2$OR$_c$ group is bonded via an intermediary or intermediaries M to the same or different carbon atoms of Y except that more than 2 such groups cannot of course be directly linked to the same carbon atom in Y if that carbon atom forms part of the polymer backbone.

The group Y may e.g. be

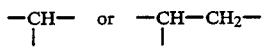

or alkyl-substituted derivatives thereof (particularly lower alkyl of 1 to 5 carbon atoms, such as methyl). Thus, as an example, the repeat unit A of formula 1 might be derived from the polymerisation (usually free-radical initiated) of a polymerisable olefinically unsaturated ester or amide formed from the reaction of an unsaturated carboxylic acid, or an esterifiable or amidifiable derivative thereof such as an acid chloride or anhydride, and a hydroxy compound of formula HO—M$^1$—(O)hd x SO$_2$OR$_c$ (to form the ester) or an amine of formula H$_2$N—M$^1$—(O)$_x$SO$_2$OR$_c$ (to form the amide) (where M$^1$ will form part of the linking intermediary M). The acid used to form the ester or amide might e.g. be acrylic or methacrylic acid, giving rise to structures for A of:

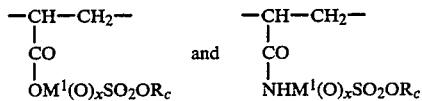

in the case of acrylic acid, and

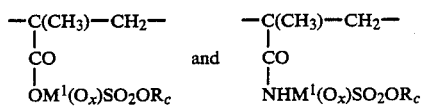

in the case of methacrylic where the links —COOM$^1$— and —CONHM$^1$—represent M. M$^1$ in such cases could e.g. be alkylene, arylene, alkenoxy or polyalkenoxy as described above.

Rather more simply, the repeat units A of formula I may be derived from the free-radical initiated polymerisation of an appropriately substituted olefine e.g. an olefine of formula CH$_2$=CHM(O)$_x$SO$_2$OR$_c$ (where M is now a single divalent linking group) or a related compound CH$_2$=CHM(O)$_x$SO$_2$G where G is a group that is readily convertable to —OR$_c$ after polymerisation, and in particular is a halogen such as Cl (or B$_r$) which may be easily converted to —OR$_c$ after polymerisation e.g. by reaction with an alkanol R$_c$OH. We have employed this technique extensively by employing as starting monomer for making repeat units A either styrene p-sulphonate esters (CH$_2$=CH—Ph—SO$_2$OR$_c$ where —Ph— is para phenylene) or styrene p-sulphonyl chloride (CH$_2$=CH—Ph—SO$_2$Cl), the former yielding directly repeat units A of formula:

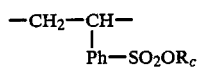

and the latter yielding repeat units A of formula:

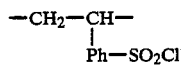

which may be readily converted to the above-mentioned A units by esterification with R$_c$OH. In fact we prefer to proceed via the acid chloride in this system (see examples) because the styrene p-sulphonate esters themselves have tended to yield polymers of lower molecular weights and require repeated initiation to facilitate complete polymerisation whereas the acid chloride monomer polymerises smoothly to yield high molecular Weight material.

If the polymer used in the coating composition of the invention contains alkylene oxide or poly(alkylene oxide) groups, this expedient will in itself provide a degree of anti-fouling (antiadhesive) behaviour for the coating in the same manner as described in European Patent Publication No. 0182523A and UK Patent Publication No. 2167075A discussed hereinbefore. Such groups could e.g. comprise or form part of the intermediary or intermediaries M or residue(s) R$_c$ in a repeat unit A of formula I, or could be located in repeat unit A but not be part of a linking group M or residue R$_c$. They could also be located in repeat unit B of formula II as part of groups R$_d$ or R$_e$. Additionally or alternatively such alkylene oxide or poly(alkylene oxide) groups could form part of other repeat units of the polymer not associated with a sulphonate or sulphate ester group (as they are in repeat units A if they form part of or comprise intermediaries M or residues R$_c$ or are located elsewhere in the repeat units A, or as they are in repeat units B if they form part of residues R$_d$ or R$_e$). Such additional or alternative alkylene oxide or poly(alkylen oxide)-containing repeat units, i.e. units not being associated with a sulphonate or sulphate ester group(s), are hereinafter termed repeat units C. The erodible polymer of the coating composition preferably comprises 0 to 50 mole % (more preferably 0 to 40 mole % and particularly D to 3U mole of such repeat units C (and if used, preferably up to mole %, more preferably up to 4D mole % and particularly up to 30 mole % of repeat units C) where the chain length of the polyalkylene oxide usually comprises 1 to 200 of such units. A repeat unit C preferably has the formula:

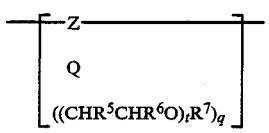

wherein t is an integer of from 1 to 200, preferably between 1 and 6D and particularly between 1 and
q is an integer of from 1 to 4, preferably 1 or 2;
Z, which in the repeating units C of formula III may be the same or different, is a hydrocarbyl residue or a substituted derivative thereof (providing part of the polymer backbone);
$R^5$, which in the same repeating unit C of formula III III (when t or q is two or more) or in different repeat units C of formula III may be the same or different, is hydrogen or methyl;
$R^6$, which in the same repeat unit C of formula III (when t or q is 2 or more) or in different repeat unit C of formula 111 may be the same or different, is hydrOgen or methyl;
except that $R^5$ and $R^6$ in a single unit $(CHR^5CHR^{60})$ cannot both be methyl;
$R^7$, which in the same repeating unit C of formula III (when q is 2 or more) or in different repeating units C of formula III may be the same or different, is hydrogen or an alkyl group (e.g. a lower alkyl group containing 1 to 5 carbon atoms such as methyl), or an acyl group;
and wherein each $(CHR^5CHR^{60})_t$ group is joined via an intermediary or intermediaries Q to the hydrocarbyl residue Z, and in cases Where q is 2 to 4 may be joined by Q to the same Or different carbon atoms of Z;
and wherein Q represents one or more intermediaries and wherein Q may be the same or different in the repeat units C and is selected from one or more direct links and one or more atoms or groups of atoms prOviding a chain Of one or more atoms for linking a $(CHR^5CHR^6O)_t$ group with Z, except that more than two $(CHR^5CHR^6O)_t$ groups cannot be directly linked to the same carbon atom in Z if that carbon atom forms part of the main chain pOlymer backbone.

In repeat unit C of formula III, each $(CHR^5CHR^6O)_t$ group is joined to the hydrocarbyl residue Z by means of an intermediary or intermediaries (i.e. by a linking entity or entities), this or these being denoted by Q, which is selected from one or more direct links and one or more atoms or groups of atoms providing a chain of one or more atoms for linking a $(CHR_5CHR_6O)_n$ group(s) with Z. Usually. Q does not contain a hydrolytically unstable linkage. In cases where q is 2 to 4, each $(CHR^5CHR^6O)_t$ group may be joined by Q to the same or, in cases where Q represents more than one intermediary, to the same or different carbon atoms in Z, although more than two $(CHR^5CHR^6O)_t$ groups cannot of course be directly linked to the same carbon atom of Z if that carbon atom forms part of the main chain polymer backbone. It will be noted that in principle Q can represent up to 4 separate intermediaries in repeat unit C (in cases where q is 4). Q may be the same or different in the repeat units C of formula III.

In repeat unit C of formula III, Z may e.g. be

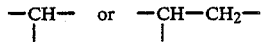

or alkyl substituted derivatives thereof (particularly lower alkyl of 1 to 5 carbon atoms such as methyl) e.g.

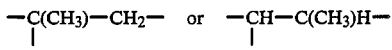

While Q may represent one or more direct links in repeat unit C of formula lll, it is preferred in the present invention that Q is one or more atOms or groups of atoms providing a linking chain of one or more atoms; such a chain will normally comprise one Or more carbon and/or hetero atoms (particularly N and/or O). Particularly preferred examples of linkages provided by Q are:

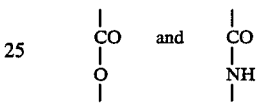

where the top bonds are to Z and the bottom bonds are to $(CHR^5CHR^6O)_t$.

It is preferred in repeat unit C o: formula III that q is 1 or 2 (so that Q can then represent one, or at most two intermediaries).

Preferably a repeat unit C of formula III is derived from the polymerisation (usually free-radical initiated) of a pOlymerisable olefinically unsaturated ester or amide formed from the reaction of an alpha, beta unsaturated carboxylic acid (or an esterifiable or amidifiable derivative thereof such as an acid chloride or anhydride) and a hydroxy compound of formula $HO-(CHR^5CHR^6O)_tR^7$ (to form the amine of formula $H_2N-(CHR^5CHR^6O)_tR^7$ (to form the amide). Preferably the acid used to form the ester or amide is acrylic or methacrylic acid, particularly the latter, giving rise, respectively, to the following structures for C:

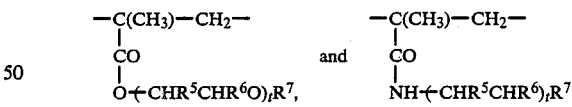

Repeat units C might also be formed by polymerisation of the alpha, beta unsaturated carboxylic acid itself (or an esterifiable derivative thereof such as an acid chloride), e.g. acrylic or methacrylic acid (or their acid chlorides), followed by esterification of the polymer acid groups (or acid chloride groups) with an alkylene oxide such as ethylene oxide or propylene oxide.

The repeating units C may alternatively be formed by the partial esterification or amidification of an already-polymerised olefinically unsaturated alpha, beta carboxylic acid (or an esterifiable or amidifiable derivative thereof such as an acid chloride or anhydride) using, preferably, an alcohol of formula $HO-(CHR^5CHR^6O)_tR^7$ or an amine of formula $H_2N-(CHR^5CHR^6O)_tR^7$. The remaining (unesterified or unamidified) carboxyl groups, if any, with their associated sections of the polymer backbone will of course provide acidic units of structure D (see later; the same of course applies to esterification with an alkylene oxide).

Normally the repeat units C (if present) will all be of the same specific structure, although the scope of the invention is intended to embrace polymers having repeat units C of more than one specific structure.

In repeat unit C to formula III, it is preferable that substantially both of the $R^5$ and $R^6$ groups may be hydrogen in which case $(CHR^5CHR^6O)_t$ is $(CH_2CH_2O)_t$. Alternatively one of $R^5$ and $R^6$ may be hydrogen and one methyl, giving rise to $(CH_2C(CH_3)HO)_t$ or $(CH(CH_3)CH_2O)_t$. Such groups may be derived from the alcohol $HO+CHR^5CHR^6O)_tR^7$ or the corresponding amine $H_2N+CHR^5CHR^6O)_tR^7$. Where a proportion of the $R^5$ and $R^6$ groups in the polymer are methyl, either all the $R^5$ or $R^6$ groups in one or more of the $(CHR^5CHR^6O)_t$ chains may be methyl, or one or more (but not all) of the $R^5$ or $R^6$ groups in one or more of the $(CHR^5CHR^6O)_t$ chains may be methyl. $R^5$ and $R^6$ should not, however, both be methyl in the same unit $(CHR^5CHR^6O)_t$ as specified hereinbefore. Such a chain could for example be derived from an amine such as $H_2N+CH(CH_3)CH_2O)_2(CH_2CH_2O)_4C_4H_9$ (where $CHR^5CHR^6$ is $CH(CH_3)CH_2O$ and $CH_2CH_2O$, t is 6, and $C_4H_9$ is normal butyl), or other analogous amines (varying $CHR^5CHR^6O$ and $_t$). It could also be derived from an alcohol, such as $HOCH(CH_3)CH_2OR^7$.

It should be appreciated that in many cases, repeat unit C of formula III will be derived from a polyalkenoxy monomer (particularly if obtained commercially) which may have a small spread of polyalkenoxy chain length so that, overall, n may represent an average value which is not a whole number (although strictly speaking n must be an integer in any specific polymer repeat unit). For example we have made polymers according to the invention derived from a polypropylene glycol monomethacrylate of average molecular weight 420, this being mainly an equal mixture of $CH_2=C(CH_3)CO_2=CH_2CH(CH_3)=_5CH_3$ and $CH_2=C(CH_3)CO_2=CH_2CH(CH_3)=_6CH_3$ giving rise to corresponding repeat units C with n=5 and n=6 but with an overall (average) n value of about 5.5.

Preferably $R^7$ is a lower alkyl group containing 1 to 5 carbon atoms, e.g. n-butyl or (more preferably) methyl. It may, nevertheless, be hydrogen.

The erodible polymer used in the coating composition of the invention may also optionally comprise one or more repeat units which contain acidic and/or basic groups (other than those derivable from sulphonate or sulphate ester hydrolysis in the polymer molecule). Such repeat units are hereinafter termed repeat units D, and the polymer of the coating composition of the invention preferably comprises 0 to 30 mole % (more preferably 0 to 20 mole % and particularly 0 to 10 mole % of such repeat units D (and if present, preferably up to 30 mole %, more preferably up to 20 mole % and particularly up to 10 mole % of repeat units D). An acidic or basic repeat unit D preferably has the formula:

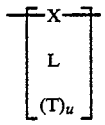

IV wherein X, which in the repeating unit D of formula IV may be the same or different, is a hydrocarbyl residue or a substituted derivative thereof (providing part of the polymer backbone);

u is an integer of 1 to 4;

T, which in the repeating units D of formula IV may be the same or different, is a group bearing an acidic or basic substituent (other than one derivable from sulphonate or sulphate ester hydrolysis);

and wherein each T group is joined via an intermediary or intermediaries L to the hydrocarbyl residue X, and in cases where u is 2 to 4 may be joined by L to the same or different carbon atoms of X; and wherein L represents one Or more intermediaries and wherein L may be the same or different in the repeat units D of formula IV and is selected from one or more direct links and one or more atoms or groups of atoms providing a chain of one or more atoms for linking a T group with X, except that more than two T groups cannot be directly linked to the same carbon atom in X if that carbon atom forms part of the main chain polymer backbone.

Preferably the repeat unit D represents the repeating unit derived frOm the polymerisation (usually free-radical initiated) of one or more polymerisable olefinically unsaturated monomers which bear a basic group, e.g. a tertiary amino group, or an acidic group, e.g. a carboxylic acid group. Examples of such carboxylic acid group-bearing monomers are acrylic acid, methacrylic acid, maleic (or fumaric) acid, itaconic acid, N-methacryloyl alanine, and N-acryloyl hydroxy glycine. An example of a tertiary amino-bearing unsaturated monomer is N,N-dimethyl-2-aminoethyl methacrylate. Preferred examples of monomers for yielding repeat units D at our present stage of knowledge are methacrylic acid, acrylic acid, maleic acid, and N,N-dimethyl-2-aminoethyl methacrylate. Usually, the repeating units D (if present) will all be of the same specific structure, although the scope of the invention is intended to embrace polymers having repeating units D of more than one specific structure.

The erodible polymer used in the coating composition of the invention besides comprising repeat units containing sulphonate and/or sulphate ester groups such as those defined above denoted by A and/or B, and optionally repeat units C containing alkylene oxide or poly(alkylene oxide) groups, and optionally repeat units D containing acidic and/or basic groups, may also optionally comprise one or more other types of repeat unit(s). Such other repeat units, i.e. repeat units other than those containing sulphonate or sulphate ester groups or having the structures of repeat units C or D, are hereinafter collectively termed repeat units E (for convenience). The erodible pOlymer preferably comprises 0 to 99 mole % (if present, preferably up to 99 mole %) of repeat units E (more preferably 5 to 97 mole % and particularly 30to 95 mole % of such units). Such other repeat units E may e.g. be provided by the free-radical addition polymerisation or one or more olefinically unsaturated monomers (different to those already mentioned hereinbefore and usually of a simpler, well-known type) or by condensation or other polymerisation processes as appropriate to the erodible polymer according to the invention that is being prepared. Examples of monomers for free-radical addition polymerisation to form repeat units E include esters and amides of olefinically unsaturated carboxylic acids, e.g. acrylic or methacrylic acid esters (e.g. methyl acrylate, methyl methacrylate, ethyl acrylate, ethyl methacrylate, acrylamide, methacrylamide, etc), alpha aryl-substituted monoolefines (such as styrene or alpha methyl styrene), vinyl esters such as vinyl acetate, vinyl or vinylidene halides such as vinyl chloride and vinylidene chloride, olefinically unsaturated nitriles such as acrylonitrile and methacrylonitrile, and dienes such as 1,3-butadiene, isoprene and chloroprene.

Preferred erodible polymers in the coating compositions of the invention comprise 3 to 40 mole a of one or more repeat units A and/or B, 0 to 40 mole % of one or more repeat units C, 0 to 20 mole % of one or more repeat units D and 5 to 97 mole % of one or more repeat units E. Particularly preferred polymers comprise 3 to 30 mole Q of one or more repeat units A and/or B, 0 to 30 mole % of one or more repeat units C, 0 to 10 mole % of one or more repeat units D, and 30 to 95 mole % of one or more repeat units E.

The erodible polymers used in the coating compositions of the invention need not be straight chain polymers, but may also be branched and/or (to a very small extent) cross-linkable.

It is tO be understood that the definition of the erodible polymer (as given hereinbefore) is also intended to embrace a polymer in which at least some of the acidic or basic groups in the repeat units D, if present, have been converted to the corresponding salt anions or cations, e.g. $CO_2{}^-$—in the case of $CO_2H$ groups or quaternary ammonium cations in the case of amines (these still being considered as carboxyl or amino groups as far as the definition of D is concerned). Such a conversion could e.g. be effected as a result of incorporating the polymer into an alkaline or acidic medium (respectively).

Typically the erodible pOlymers used in the coating composition of the invention have weight average molecular weights ($M_w$) within the range of from 5,000 to 500,000 (more usually 50,000 to 300,000), although we do not exclude the possibility that suitable erodible polymers having molecular weights outside this range may be used in the present invention.

It is believed that the erodible polymers which comprise one or more repeat units A (as defined herein) are themselves new and patentable compounds and accordingly such polymers are also provided according to the invention.

There is further provided according to the invention a method of treating a surface of an object which method comprises applying to said surface a coating composition as defined herein thereby to form on the surface (after removal of any liquid carrier) a water-erodible coating comprised of at least one polymer comprising one or more hydrolysable groups selected from sulphonate esters and sulphate esters which in an aqueous environment will generate by hydrolysis corresponding polymer-bound acid groups on polymeric material at the environment -exposed exterior portion of the cOating.

Naturally the said at least one erodible polymer of the coating composition will be dispersed or dissolved in a suitable medium, vehicle or carrier therefor in the compOsition; this may comprise mainly water, i.e. be aqueous-based, but can also be (and usually is) organic-based (e.g. xylene, methanol, ethanol or ethanol/water-based) or even a liquid prepolymer. Other ingredients as required may also be included in the composition. Examples of these include additional polymeric materials (optionally also water-erodible but not of course as already defined above), biocides of one sort or another (e.g. algicides, fungicides, bacteriocides)—but preferably not based on tin—to impart or enhance anti-fouling behaviour, catalysts and plasticisers (or other types of diluent or filler) for further controlling the hydrolysis rate (catalysts for speeding it up for example, and plasticisers for slowing it down), releasable (diffusion-controlled) hydrocarbon and silicon oils, again for further enhancing anti-fouling behaviour (see before), stabilisers, fillers, pigments, dyes, anti-rust agents, coalescing agents, thickeners, defoamers, and/or any other material required for any particular application. Such substances (if used) may be incorporated or formulated into the composition by any suitable technique. It is particularly envisaged that the composition will be in the form of a paint for application to the surface, and will therefore include materials commonly used in paint formulations, such as pigments and other ingredients where appropriate (extenders, stabilisers, thickeners, coalescing solvents, defoamers, surfactants, and so on).

The method of the invention is applicable to a variety of sOlid Objects, for example, vessels, pipes and machinery of all types, e.g. stills and paper bills, having one or more surfaces that will come into contact with an aqueous medium capable of eroding the surface of the applied coating. The invention is especially applicable to the hulls of ships and coats and to other structures used in a marine environment. Moreover, the object which is treated in accordance with the method of the invention may itself be a solid coating, for example a paint coating which has been applied to a substrate for protective or decorative purposes and which itself requires protection from adhesive organisms. In some cases the composition may be part to a surface coating formulation which is to be applied to a surface so that the sur ace coating formulation serves as a vehicle for the composition without impairing the erodibility of the coating.

Surfaces which may be treated in accordance with the invention include the surfaces of inorganic materials such as metals, glass or silica and organic materials such as plastics articles and other polymeric materials such as the aforementioned coatings.

The most suitable technique for applying the composition to the surface depends upon the particular composition and surface involved and also upon the situation in which infestation is likely to occur. Application by brush, roller, pad, dipping, and spraying are e.g. envisaged where appropriate.

The present invention is now illustrated by the following examples. Unless otherwise specified all parts, percentages and ratios are on a weight basis, except for the proportions of monomer-derived units in polymers which are all expressed on a mole % basis. The following abbreviations are employed in the examples: n-BA: repeat unit derived n-butyl acrylate, i.e. of formula 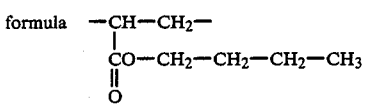

MMA: repeat unit derived from methyl methacrylate, i.e. of formula 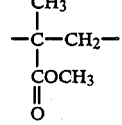

SSCl: repeat unit derived from styrene p-sulfonyl
chloride, i.e. of formula
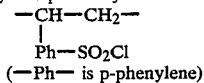
(—Ph— is p-phenylene)

S: repeat unit derived from styrene, i.e. of formula
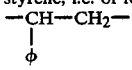

SSE (alkyl): repeat unit derived from styrene p-
sulphonate alkyl ester, with the alkyl group from
the alkanol following in parenthesis, e.g.
SSE (methyl) has the formula
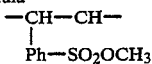
SSW (n-butyl) has the formula
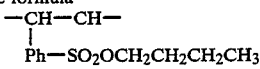

PPGMA: repeat unit of the formula
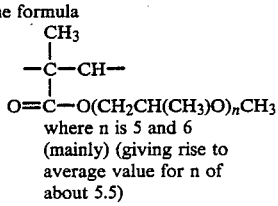
where n is 5 and 6
(mainly) (giving rise to
average value for n of
about 5.5)

Examples 1 to 15

Copolymers according to the invention (Examples 1 to 15) were prepared by copolymerising styrene p-sulphonyl chloride ($CH_2=CH-Ph-SO_2Cl$ where —Ph—is para phenylene) either with n-butyl acrylate and methyl methacrylate, or with n-butyl acrylate and styrene, to yield copolymers with pendant —Ph—$SO_2Cl$ groups, followed by esterification of the sulphonyl chloride groups with various alkanols to yield the various copolymers according to the invention.

Synthesis of styrene p-sulphonyl chloride

A flask containing 300 ml dry dimethyl formamide was cooled in an ice/salt bath to 3° C. Thionyl chloride (250 ml) was added dropwise with stirring over a period of 2 hrs. Sodium styrene p-sulphonate (200 g) was added in aliquots over a further 1 hour. The reaction mixture was allowed to stand for 24 hours at room temperature. The solution was poured onto ice and extracted with toluene (1000 ml). The extract was neutralised with sodium carbonate, washed with water, dried over magnesium sulphate and the solvent removed by evaporation under vacuum at 30° C. Finally the purified styrene p-sulphonyl chloride was filtered and stored at 5° C. in the dark.

The above procedure closely followed that described by Kamogawa et al (Bull Chem Soc Japan 56 762 1983).

Synthesis of copolymers with pendant sulphonyl chloride groups (a) Using n-butyl acrylate and methyl methacrylate as comonomers.

A typical polymerisation is described. Polymerisation was carried out in 4-necked reaction vessel. n-Butyl acrylate (0.8 mole) and methyl methacrylate (0.8 mole) were added with xylene (500 ml) to the flask and the vessel contents stirred for 1 hour at 68° C. Nitrogen was bled through the system to remove oxygen. After degassing, azoisobutyronitrile (AIBN) initiator (4.87 g) was added. A solution of styrene p-sulphonyl chloride (0.4 mole) and AIBN initiator (4.87 g) in xylene (90 ml) was fed into the stirred reaction vessel by means of a peristaltic pump at a rate of 2 ml per minute and polymerisatiOn was continued for 24 hours at 68° C. to form the copolymer. It was found by chemical analysis that the comonomers used reacted to give corresponding repeat units in the copolymer which were present in relative mole ratios very close the mole ratios used for the starting comonomers; this applied to all copolymers prepared. Accordingly the cOmpOsition of the above described copolymer was n-BA (40 mole %)/MMA (40 mole %)/SSCl (20 mole %).

(b) Using n-butyl acrylate and styrene as comonomers

Xylene (100 ml) and butyl acrylate (0.08 mole) were added to the 4-necked reaction flask and stirred for 30 minutes under nitrogen to remove dissolved oxygen. AIBN initiator, (0.164 g) was added. A mixture of styrene (0.08 mole), styrene p-sulphonyl chloride (0.04 mole), eylene (100 ml) and AIBN (0.328 S g) were fed into the reaction mixture over a period of eight hours.

Polymerisation was continued for 24 hours at 68° C. to yield a copolymer of composition n-BA (40 mole %)/S ((40 mole %)/SSCl (20 mole %). Polymers containing 5 and 10 mole % SSCl were also prepared using this method.

Esterification of copolymers containing pendant sulphonyl chloride groups

A typical esterification is described. The solution of copolymer in xylene was used as prepared in a) or b). To a solution containing 5 g copolymer (20 mole % SSCl content), triethylamine ($2 \times 10^{-2}$ mole) and alkanol ($2 \times 10^{-2}$ mole) were added. The reaction mixture was allowed to stand for 24 hours, and filtered to remove triethylamine hydrochloride; this resulted in a clear solution in xylene of the copolymer sulphonate ester containing styrene p-sulphonate ester units (SSE units). Microanalysis of samples indicated that esterification was quantitative for all the copolymers prepared.

The following copolymer sulphonate esters according to the invention (as shown in Table 1) were prepare using the processes described above.

TABLE 1

| Example No. | Copolymer composition (units and mole % of units) | Method used for SSCl intermediate (a) or (b) |
|---|---|---|
| 1 | n-BA/MMA/SSE (ethyl) 40 40 20 | (a) |
| 2 | n-BA/MMA/SSE (n-butyl) 40 40 20 | (a) |
| 3 | n-BA/MMA/SSE (n-hexyl) 40 40 20 | (a) |
| 4 | n-BA/S/SSE (ethyl) 40 40 20 | (b) |
| 5 | n-BA/S/SSE (n-propyl) 40 40 20 | (b) |
| 6 | n-BA/S/SSE (iso-propyl) 40 40 20 | (b) |
| 7 | n-BA/S/SSE (n-butyl) 40 40 20 | (b) |
| 8 | n-BA/S/SSE (iso-butyl) 40 40 20 | (b) |
| 9 | n-BA/S/SSE (tert-butyl) 40 40 20 | (b) |
| 10 | n-BA/S/SSE (n-hexyl) 40 40 20 | (b) |
| 11 | n-BA/S/SSE (cyclohexyl) | (b) |

TABLE 1-continued organo-tin-polymer therein similarly examined (see Table 2).

TABLE 2

| Ex. No. of compn. | Ex No. of copol. used in compn. | % Conversion of ester to acid groups with time | | | | | | | |
|---|---|---|---|---|---|---|---|---|---|
| | | 1 hr | 2 hr | 3 hr | 4 hr | 5 hr | 6 hr | 7 hr | 8 hr |
| 16 | 1 | 0.77 | 1.34 | 1.88 | 2.20 | 2.45 | 2.68 | 2.90 | nm |
| 17 | 2 | 5.10 | 7.30 | 8.60 | 9.51 | 10.34 | 11.15 | 11.74 | nm |
| 18 | 3 | 4.41 | 6.48 | 7.72 | 8.65 | 9.14 | 9.72 | 10.11 | nm |
| 19 | 4 | 0.99 | 1.47 | 1.91 | 2.19 | 2.45 | 2.63 | 2.80 | nm |
| 20 | 5 | 0.74 | 1.55 | 2.25 | 2.85 | 3.23 | 3.55 | nm | nm |
| 21 | 6 | 0.22 | 0.60 | 1.19 | 1.73 | 2.30 | 3.06 | 3.80 | nm |
| 22 | 7 | 5.19 | 7.23 | 8.43 | 9.27 | 10.12 | 10.86 | 11.53 | 12.12 |
| 23 | 8 | 3.87 | 7.63 | 11.70 | 12.40 | 13.30 | 14.10 | nm | nm |
| 24 | 9 | 5.60 | 10.80 | 16.40 | 21.30 | 27.60 | 32.40 | nm | nm |
| 25 | 10 | 4.17 | 6.29 | 7.55 | 8.44 | 9.03 | 9.68 | 10.04 | 10.52 |
| 26 | 11 | 3.07 | 4.99 | 6.31 | 7.91 | 8.36 | 8.78 | nm | nm |
| 27 | 12 | 0.35 | 0.65 | 0.90 | 1.11 | 1.31 | 1.47 | 1.59 | nm |
| 28 | 13 | 0.35 | 0.65 | 0.92 | 1.19 | 1.39 | 1.58 | 1.75 | nm |
| 29 | 14 | 0.55 | 1.22 | 1.88 | 2.30 | 2.78 | 3.19 | nm | nm |
| 30 | 15 | 0.37 | 0.95 | 1.52 | 1.91 | 2.45 | 2.65 | nm | nm |
| 31 | — | 0.47 | 0.78 | 0.99 | 1.14 | 1.30 | 1.41 | 1.55 | 1.68 | nm = not measured

| Example No. | Copolymer composition (units and mole % of units) | Method used for SSC1 intermediate (a) or (b) |
|---|---|---|
| 12 | n-BA/S/SSE (ethyl) 40 40 20 45 45 10 | (b) |
| 13 | n-BA/S/SSE (n-propyl) 45 45 10 | (b) |
| 14 | n-BA/S/SSE (n-butyl) 45 45 10 | (b) |
| 15 | n-BA/S/SSE (n-hexyl) 45 45 10 | (b) |

The copolymers of Examples 1 to 15 were all in the weight average molecular weight ($M_w$) range of 130,000 to 240,000 (as measured by gel permeation chromatography).

It may be remarked that copolymers n-BA/MMA/SSE (alkyl) (47.5/47.5/5) have also been prepared (method a)) but nOt yet tested. Also, copolymers MMA/PPGMA/SSE (alkyl) (60/30/10) have been prepared (via a method similar to b)) but not yet tested.

Examples 16 to 31

Samples of the xylene solutions of the copolymers of Examples 1 to 15 were each compounded with zinc oxide (white pigment) in 65:35 copolymer solid: zinc oxide (w/w) ratios to form simple paint coating compositions (Examples 16 to 30). The hydrolytic behaviour of the copolymers of these compositions in the presence of the ZnO pigment also in the compositions (as would occur in an applied coating after drying) was estimated as follows.

Each composition was dried and pulverised using a mortar and pestle. A known weight of the desired composition was suspended in distilled water at pH 8.15 (sea water pH) at 35° C. with constant agitation. The suspension was titrated with 0.01 M sodium hydroxide hourly to maintain the initial pH thereby enabling the % conversion of sulphonate ester to sulphonic acid groups to be estimated hourly. The hydrolysis results are shown in Table 2. For comparison purposes, a composition of 65 parts of a polymer mixture containing 33% of a commercially available tributyl tin methacrylate copolymer (a known self-polishing polymer) and 67% of polymethyl methacrylate with 35 parts of ZnO was prepared (Example 31) and the hydrolytic behaviour of the It will be noted form the results in Table 2 that, as would be expected, the copolymers having b 10 mole % of SSE units hydrolysed more slowly than those with copolymers containing 20 mole % of SSE, other things being equal (compare Example pairs 19, 27; 20, 28; 22, 29; and 25, 30). Also, perhaps surprisingly, the coppolymers with units of the longer chain SSE alkyl esters used - SSE (n-butyl), SSE (iso-butyl), SSE(tert-butyl), SSE (n-hexyl), SSE (cyclohexyl) - hydrolysed faster than the copolymers with the shorter chain SSE alkyl esters -SSE (ethyl), SSE (n-propyl), SSE (iso-propyl) (compare Examples 17,18, 22, 23 24 25 26 against Examples 16, 19, 20, 21, all with 20 mole % SSE units). This effect clearly allows a useful degree of control over the rate of hydrolysis in a coating to be achieved by an appropriate choice of alkyl ester. It will be noted that the known self-polishing tin-containing copolymer i Example 31 hydrolysed at about the same rate as the coppolymers used for Examples 27 and 28 pcontaining units of SSE (ethyl) and SSE (n-propyl) at a lev el of 10 mole % (all other copolymers hydrolysing faster to a smaller or larger degree). It was also noted that, initially, the polymer and pigment particles were tightly bound together providing a granular solid phase suspended in a clear aqueous phase but that as hydrolysis proceeded the aqueous phase became increasingly opaque (milky white) due to the release of ZnO associated with the hydrolysed polymer. Visually, this increase in opaqueness appeared to follow the rate of hydrolysis, indicating that coatings containing the copolymers would be usefully erodible.

We claim:

1. Coating composition suitable for treating a surface so as to provide a water-erodible coating thereon, which composition is a paint composition comprising at least one erodible polymer, wherein said at least one erodible polymer is a polymer which comprises one or more repeat units A each comprising at least one hydrolysable sulphonate ester group pendant to the main chain backbone of the polymer, wherein said repeat unit A has the formula:

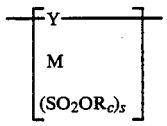

wherein Y, which in the repeat units A of formula I may be the same or different, is a group in the main chain backbone and is selected from

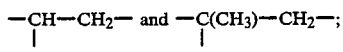

s is an integer of 1 of 2 pcorresponding to the number of SO₂ORc groups in repeat unit A of formula I;

$R_c$, which in the same repeat unit A of formula I (when s is 2or in different repeat units A of formula I may be the same or different, is a group selected from one or more of alkyl, aryl, alkaryl, aralkyl, alkenoxyalkyl and poly(alkenoxy)alkyl groups;

and wherein each SO₂OR$_c$ group if joined via an intermediary M to the group Y;

and wherein M represents an intermediary in a repeat unit A of formula I which is selected from —alkylene—, —CO—O—(alkylene)—, —CO—NH—(alkylene)—, —NH—CO—(alkylene)—, —(arylene)—, (alkylene)—(arylene)—, —(alkylene)—o—(alkylene)—, —(alkylene)—o—(arylene)—, —(arylene)—o—(arylene), —(arylene)—o—(alkylene)—, —alkenoxy—, and —polyalkylenoxy—groups.

2. Coating composition according to claim 1 wherein M is a group selected from —CO—O—(alkylene)—and —(arylene)—.

3. Coating composition according to claim 2 wherein M is selected from o, m, or p-phenylene.

4. Coating composition according to claim 1 wherein s is 1.

5. Coating composition according to claim 1 wherein $R_c$ is selected from one or more of alkyl (having 1 to 20 carbon atoms), phenyl and benzyl.

6. Coating composition according to claim 1 wherein repeat unit A has the formula:

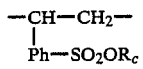

wherein —Ph— is p-phenylene.

7. Coating composition according to claim 1 wherein said erodible polymer comprises one or more repeat units E, being repeat units derived from one or more monomers selected from esters and amides of olefinically unsaturated carboxylic acids, alpha aryl-substituted monoolefins, vinyl esters, vinyl halides, vinylidene halides and olefinically unsaturated nitriles.

8. Coating composition according to claim 7 wherein the repeat units E are derived from one or more monomers selected from methyl acrylate, methyl methacrylate, ethyl acrylate, ethyl methacrylate, n-butyl acrylate, acrylamide, methacrylamide, styrene, alpha-methyl styrene, vinyl chloride, vinylidene chloride, acrylonitrile and methacrylonitrile.

9. Coating composition according to claim 1 which composition includes at least one biocide.

10. Coating composition according to claim 1 wherein the said erodible polymer is a copolymer of lower alkyl acrylate, styrene or methyl methacrylate, and styrene sulphonate lower alkyl ester.

11. A coating composition according to claim 10 wherein said erodible polymer is a copolymer of butyl acrylate, styrene and styrene sulphonate butyl ester.

* * * * *

UNITED STATES PATENT AND TRADEMARK OFFICE
CERTIFICATE OF CORRECTION

PATENT NO. : 4,970,269

DATED : November 13, 1990

INVENTOR(S) : HUMPHRIES et al.

It is certified that error appears in the above-identified patent and that said Letters Patent is hereby corrected as shown below:

Column 1, line 23, "sbip's" should be --ship's--;

line 25, "and-" should be --and--;

line 48, "cOatings" should be --coatings--; and line 59, "WO84/02915" should be --WO 84/02915--.

Column 2, line 3, "Which" should be --which--;

line 14, "54" should be --$\underline{54}$--;

line 24, "100° C." should be --100 C--;

line 29, "77-B129 Which" should be --77-81289 which-- and "With" should be --with;

line 31, "Water" should be --water--;

line 32, "On" should be --on--;

line 39, "qlycol" should be --glycol--;

line 47, "38" should be --$\underline{38}$--;

line 48, "16" should be --$\underline{16}$--;

line 55, "cOmpounds" should be --compounds--;

UNITED STATES PATENT AND TRADEMARK OFFICE
CERTIFICATE OF CORRECTION

PATENT NO. : 4,970,269
DATED : November 13, 1990
INVENTOR(S) : HUMPHRIES et al.

It is certified that error appears in the above-identified patent and that said Letters Patent is hereby corrected as shown below:

line 61, "WO80/00554" should be --WO 80/00554--; and line 66, "sutters" should be --suffers--.

Column 3, line 56, "1 to 3" should be --8.1 to 8.3--; and line 60, "$R_1OSO_2$" should be --$R_1-OSO_2OR_0$--.

Column 4, line 22, "mentiOned" should be --mentioned--;

line 36, "a" should be --β--; and "Which" should be --which--;

line 54, "to erodible" should be --too erodible--;

lines 57-64,

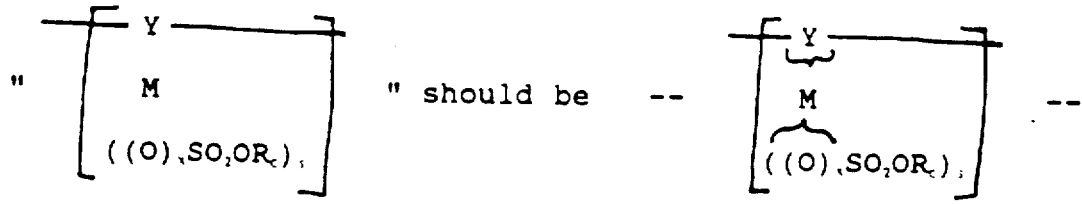

UNITED STATES PATENT AND TRADEMARK OFFICE
CERTIFICATE OF CORRECTION

PATENT NO. : 4,970,269

DATED : November 13, 1990

INVENTOR(S) : HUMPHRIES et al.

It is certified that error appears in the above-identified patent and that said Letters Patent is hereby corrected as shown below:

line 65, "1" should be --I--.

Column 5, line 1 "s is an interger of 1 or more" should be moved to the next line.

line 12, "Where" should be --where--;

line 19, "$[R_3-(O)_r-SO_2-O\{R_4-O-SO_2-(O)_s\}_t]$" should be --$[R_3-(O)_r-SO_2-O\{R_4-O-SO_2-(O)_s\}_t]$--;

line 21, "O" should be --0--;

line 22, "O" should be --0--; and line 67, "or         -NH-CO-(alkylene)-" should be --or -NH-Co-(alkylene)- --:

Column 6, line 15, "betWeen the hydrolysadle" should be --between the hydrolysable--;

line 19, "light" should be --might--;

line 24, "$-CR_1-$" should be -- $-CR_1-$ --;

UNITED STATES PATENT AND TRADEMARK OFFICE
CERTIFICATE OF CORRECTION

PATENT NO. : 4,970,269

DATED : November 13, 1990

INVENTOR(S) : HUMPHRIES et al.

It is certified that error appears in the above-identified patent and that said Letters Patent is hereby corrected as shown below:

line 25, "R.-groups" should be --$R_2$-groups--;

line 34, "R3 and R4" should be --$R_3$ and $R_4$--;

line 35, "-CHR,CHR,O-unit" should be -- -$CHR_3CHR_4O$- unit--;

line 39, "-(CH,CH,O),-and" should be -- -$(CH_2CH_2O)_n$- and--;

line 40, "-(CH,CH(CH3)O),-where" should be -- -$(CH_2CH(CH_3)O)_m$- where-- and "The-" should be --The--;

line 43, "use" should be --used)--; and line 54, "bydrolysis" should be --hydrolysis--.

Column 7, line 4, "Ph-(CH,),CH3" should be --Ph-$(CH_2)_p{}'$-$CH_3$--.

UNITED STATES PATENT AND TRADEMARK OFFICE
CERTIFICATE OF CORRECTION

PATENT NO. : 4,970,269

DATED : November 13, 1990

INVENTOR(S) : HUMPHRIES et al.

It is certified that error appears in the above-identified patent and that said Letters Patent is hereby corrected as shown below:

line 6, "-Ph-is" should be -- -Ph- is--;

line 37, "1" should be --I--;

line 44, "HO-M -(O)hdxSO.OR." should be --HO-M'-(O).SO.OR.--;

line 63, "-COOM'" should be -- -COOM'- --; and line 64, "-and -CONHM'-represent" should be --and -CONHM'- represent--.

Column 8, line 12, "-Ph-is" should be -- -Ph- is--;

line 35, "Weight" should be --weight--;

line 57, "poly(alkylen" should be --poly(alkylene--;

line 63, "D to 3U mole" should be --0 to 30 mole %)--; and

UNITED STATES PATENT AND TRADEMARK OFFICE
CERTIFICATE OF CORRECTION

PATENT NO. : 4,970,269

DATED : November 13, 1990

INVENTOR(S) : HUMPHRIES et al.

It is certified that error appears in the above-identified patent and that said Letters Patent is hereby corrected as shown below:

line 64, "mole" should be --50 mole-- and "4D" should be --40--.

Column 9, lines 1-8,

" 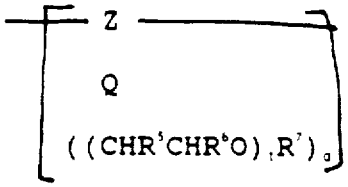 " should be -- 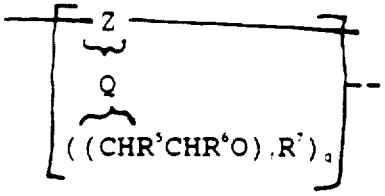 -- line 10, "6D" should be --60-- and "particularly between 1 and" should be --particularly between 1 and 20;--;

line 16, "formula III" should be --formula--;

line 23, "hydr0gen" should be --hydrogen--;

line 24, "(CHR$^5$CHR$^6$)" should be --(CHR$^5$CHR$^6$O)--;

UNITED STATES PATENT AND TRADEMARK OFFICE
CERTIFICATE OF CORRECTION

PATENT NO. : 4,970,269

DATED : November 13, 1990

INVENTOR(S) : HUMPHRIES et al.

It is certified that error appears in the above-identified patent and that said Letters Patent is hereby corrected as shown below:

line 33, "(CHR'CHR")." should be --(CHR'CHR'O),--;

line 35, "Where" should be --where--;

line 36, "Or" should be --or--;

line 42, "prOviding a chain Of" should be --providing a chain of--;

line 47, "pOlymer" should be --polymer--; and line 56, "Usually." should be --Usually,--.

Column 10, line 16, "atOms" should be --atoms--;

line 18, "Or" should be --or--;

line 32, "o:" should be --of--;

line 37, "pOlymerisable" should be --polymerisable--; and

UNITED STATES PATENT AND TRADEMARK OFFICE
CERTIFICATE OF CORRECTION

PATENT NO. : 4,970,269
DATED : November 13, 1990
INVENTOR(S) : HUMPHRIES et al.

It is certified that error appears in the above-identified patent and that said Letters Patent is hereby corrected as shown below:

line 42, "the amine" should be --the ester) or an amine--.

Column 11, line 13, "(CH(CH₃)CH₂O)t" should be --(CH(CH₃)CH₂O)$_t$- --;

line 40, "CH₂=C(CH₃)CO₂=CH₂CH(CH₃)=₃CH₃" should be --CH₂=C(CH₃)CO₂[CH₂CH(CH₃)]₃CH₃--; and line 41, "CH₂=C(CH₃)CO₂=CH₂CH(CH₃)=₆CH₃" should be --CH₂=C(CH₃)CO₂[CH₂CH(CH₃)]₆CH₃--;

Column 12, line 5, "inteqer" should be --integer--;

line 14, "Or" should be --or--;

line 24, "frOm" should be --from--;

line 54, "pOlymer" should be --polymer--;

UNITED STATES PATENT AND TRADEMARK OFFICE
CERTIFICATE OF CORRECTION

PATENT NO. : 4,970,269

DATED : November 13, 1990

INVENTOR(S) : HUMPHRIES et al.

It is certified that error appears in the above-identified patent and that said Letters Patent is hereby corrected as shown below:

line 57, "30to" should be --30 to--; and line 59, "or one" should be --of one--.

Column 13, line 10, "a" should be --%--;

line 15, "Q" should be --%--;

line 23, "tO" should be --to--;

line 28, "$CO_2$-in" should be --$CO_2^-$ in--;

line 35, "pOlymers" should be --polymers--;

line 58, "cOating" should be --coating--; and line 62, "pOsition" should be --position--;

Column 14, line 22, "sOlid Objects" should be --solid objects--;

line 23, "bills" should be --mills--;

line 36, "sur ace" should be --surface--; and

UNITED STATES PATENT AND TRADEMARK OFFICE
CERTIFICATE OF CORRECTION

PATENT NO. : 4,970,269
DATED : November 13, 1990
INVENTOR(S) : HUMPHRIES et al.

It is certified that error appears in the above-identified patent and that said Letters Patent is hereby corrected as shown below:

lines 57-62,

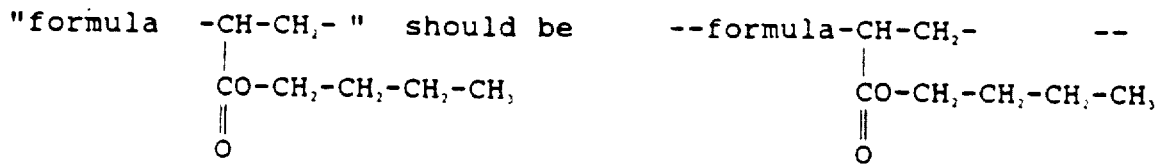

Column 15, lines 9-10,

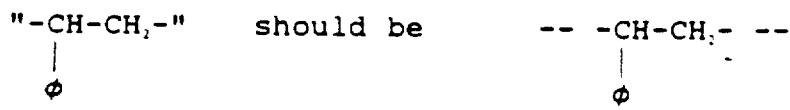

($\phi$ is phenyl)

line 35, "-Ph-is" should be -- -Ph- is- --;

line 47, "(200g}" should be --(200g)--;

line 55, "5° C." should be --5°C--; and line 58, "56" should be --56--.

UNITED STATES PATENT AND TRADEMARK OFFICE
CERTIFICATE OF CORRECTION

PATENT NO. : 4,970,269

DATED : November 13, 1990

INVENTOR(S) : HUMPHRIES et al.

It is certified that error appears in the above-identified patent and that said Letters Patent is hereby corrected as shown below:

Column 16, line 7, "polymerisatiOn" should be --polymerisation-- and "68° C." should be --68°C--;

line 11, "close" should be --close to--;

line 13, "cOmpOsition" should be --composition--;

line 23, "eylene" should be --xylene--; and "S g" should be --g--;

line 25, "68° C." should be --68°C--;

line 27, "((40" should be --(40--;

line 28, "SSCI" should be --SSCl--; and line 45, "prepare" should be --prepared--; and line 50, "SSC1" should be --SSCl--.

UNITED STATES PATENT AND TRADEMARK OFFICE
CERTIFICATE OF CORRECTION

PATENT NO. : 4,970,269

DATED : November 13, 1990

INVENTOR(S) : HUMPHRIES et al.

It is certified that error appears in the above-identified patent and that said Letters Patent is hereby corrected as shown below:

Column 17, line 36, "$(M_n)$" should be --$(M_w)$--;

line 41, "nOt" should be --not--; and line 58, "35° C." should be --35°C--.

Column 18, line 28, "form" should be --from--;

line 29, "b 10" should be --10--;

line 33, "cop-" should be --co- --;

line 44, "i" should be --in--;

line 46, "coppolymers" should be

--copolymers-- and "pcontaining" should be --containing--; and line 47, "lev el" should be --level--.

Column 19, lines 1-6,

"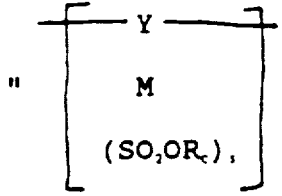" should be -- 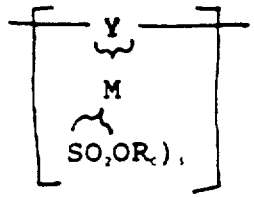 --

UNITED STATES PATENT AND TRADEMARK OFFICE
CERTIFICATE OF CORRECTION

PATENT NO. : 4,970,269  
DATED : November 13, 1990  
INVENTOR(S) : HUMPHRIES et al.

Page 13 of 15

It is certified that error appears in the above-identified patent and that said Letters Patent is hereby corrected as shown below:

line 17, "of" (second occurrence) should read --or-- and "pcorresponding" should be --corresponding--;

line 21, "2or" should be --2) or--;

line 25, "if" should be --is--;

line 33, "-o-" should be -- -O- --;

line 34, "-o-" should be -- -O- -- (each occurrence);

line 35, "-o-" should be -- -O- --;

line 36, "-polyalkylenoxy-groups" should be --polyalkylenoxy- groups--; and line 39, "-CO-O-(alkylene)-and" should be

UNITED STATES PATENT AND TRADEMARK OFFICE
CERTIFICATE OF CORRECTION

PATENT NO. : 4,970,269                                         Page 14 of 15

DATED : November 13, 1990

INVENTOR(S) : HUMPHRIES et al.

It is certified that error appears in the above-identified patent and that said Letters Patent is hereby corrected as shown below:

-- -CO-O-(alkylene)- and--.

Column 20, line 33, "the said erodible" should be --the--.

Column 3, line 26, "compositions" should be --composition--.

Column 4, line 16, "stationery" should be --stationary--; and line 66, "maybe" should be --may be--.

Column 6, line 41, "(arylene)-groups" should be --(arylene) groups--.

Column 8, line 6, "B." should be --Br--.

UNITED STATES PATENT AND TRADEMARK OFFICE
CERTIFICATE OF CORRECTION

PATENT NO. : 4,970,269

DATED : November 13, 1990

INVENTOR(S) : HUMPHRIES et al.

It is certified that error appears in the above-identified patent and that said Letters Patent is hereby corrected as shown below:

Column 9, line 21, "unit" should be --units--; and line 55, "$(CHR_1CHR_2O)_n$" should be --$(CHR^5CHR^6O)_n$--.

Column 11, line 15, "H2N" should be --$H_2N$--; and line 27, "and ,)." should be --and t).--.

Signed and Sealed this

Second Day of February, 1993

Attest:

STEPHEN G. KUNIN

*Attesting Officer*    *Acting Commissioner of Patents and Trademarks*